INVENTORS.
KONRAD H. STOKES
ROBERT C. WHITEHEAD JR.
BY
ATTORNEY.

Feb. 18, 1958 K. H. STOKES ET AL 2,823,688
CONTROLLER
Filed April 9, 1953 4 Sheets-Sheet 2

INVENTORS.
KONRAD H. STOKES
ROBERT C. WHITEHEAD JR.
BY
ATTORNEY.

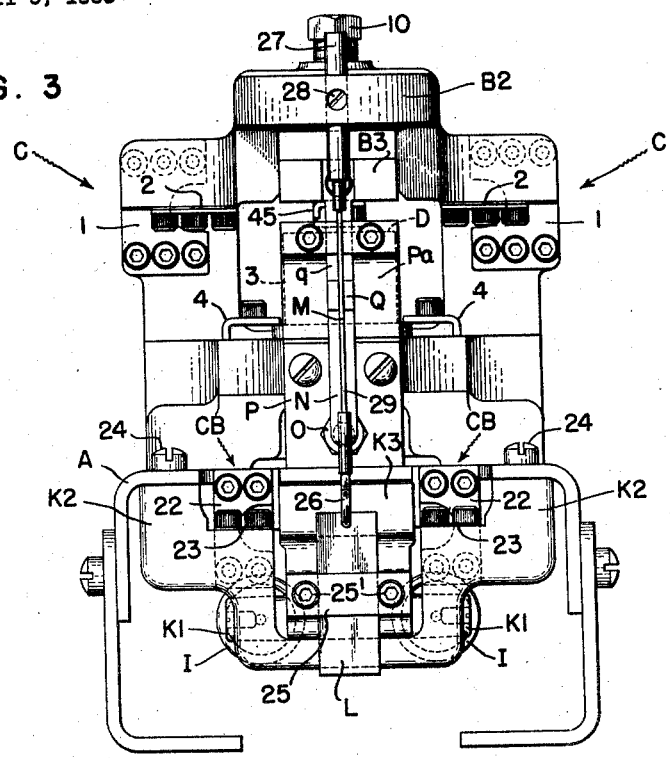
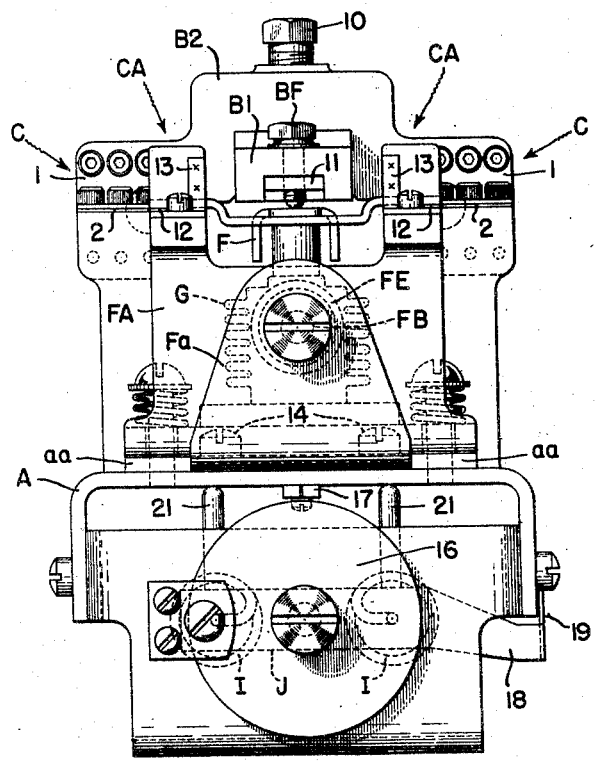
Feb. 18, 1958    K. H. STOKES ET AL    2,823,688
CONTROLLER
Filed April 9, 1953      4 Sheets-Sheet 3
FIG. 3
FIG. 4
INVENTORS.
KONRAD H. STOKES
ROBERT C. WHITEHEAD JR.
BY
ATTORNEY.

Feb. 18, 1958 K. H. STOKES ET AL 2,823,688
CONTROLLER
Filed April 9, 1953 4 Sheets-Sheet 4

INVENTORS.
KONRAD H. STOKES
ROBERT C. WHITEHEAD JR.
BY Arthur H. Swanson
ATTORNEY.

United States Patent Office 2,823,688
Patented Feb. 18, 1958

2,823,688

CONTROLLER

Konrad H. Stokes, Roslyn, and Robert C. Whitehead, Jr., Oreland, Pa., assignors to Minneapolis-Honeywell Regulator Company, Minneapolis, Minn., a corporation of Delaware Application April 9, 1953, Serial No. 347,812

14 Claims. (Cl. 137—79)

The general object of our present invention is to provide an improved pneumatic transmitting apparatus which is responsive to the varying value of a measured variable and includes mechanism for rapidly and accurately transmitting an air pressure proportional to the measured variable for a distance which may be as great as one thousand feet. Our improved transmitting apparatus was primarily devised to respond to the fluid pressure in a thermometer bulb responding to a variable temperature, but is not restricted to such use.

More specifically, the general object of the invention is to provide an improved pneumatic transmitting apparatus of the general type disclosed in the Allwein Patent 2,527,171 of October 24, 1950. The transmitting apparatus disclosed in that patent comprises suppression spring means and separate measuring, balancing and compensating expansible chamber elements. The compensating chamber element of said patent is effective, moreover, to compensate both for changes in barometric pressure and for changes in ambient temperature. Our improved pneumatic transmitter includes suppression spring means and expansible chamber elements generally analogous in operative purpose to the above mentioned chamber elements of the Allwein patent, but in our improved apparatus, the compensating chamber element compensates only for variations in barometric pressure, and compensation for ambient temperature changes is effected by the use of a bimetallic member included in and modifying the action of a mechanical linkage connecting movable elements of our transmitting apparatus. Moreover our suppression spring means differs in its form and in its mechanical connections to other apparatus elements from the spring suspension means disclosed in the Allwein patent.

Notwithstanding their similarities, our improved transmitting apparatus differs substantially from the transmitter shown in the Allwein patent, both structurely and operatively, and also in its capacity for obtaining an extraordinarily high accuracy which is not obtainable with the apparatus disclosed in the Allwein patent.

A major object of our invention is to provide a transmitter characterized by the ease and accuracy with which the measurement range, measuring span, and effective zero point of our transmitter may be fixed and separately adjusted. The attainment of a desirably high sensitvity requires the measuring span to be a relatively small portion of the maximum measuring range, and the transmitter thus requires a relatively wide and accurate suppression range. In practice, the measuring range of our improved transmitter may well vary from a temperature of −375° F., to a temperature of 1,000 degrees F., or higher. Each transmitter may be adjusted for operation through a measuring span, which may be a small span of 50° F. or a large span of 400° F., in any portion of the total range of 1375° F. Moreover, no change in transmitter parts are required in adjusting the transmitter for operation in any span in which the minimum temperature is not below −100° F. In practice, the improved transmitting apparatus may be made accurate to within one half of one percent of the span, up to a span value of 400° F.

For the attainment of the operating results desired, gradients in the improved transmitter are much higher than are customary in pneumatic instruments. For this reason, the apparatus must be designed to keep the deflections of its beam and lever elements to a minimum under the normal changes. The mechanical amplification in the detection system or portion of the apparatus may be about 45:1, and with a pilot valve having the usual 4:1 output-input pressure ratio required, the theoretical movement of the diaphragm responsive to changes in the measured temperature may be less than 25 millionths of an inch. The high gradients and high motion sensitivity required thus makes the differential expansion a very serious problem. The gravity of that problem is augmented, moreover, by the relatively high suppression ratio, which may be as great as 16:1, since error in the suppression system must be multiplied by the high suppression ratio in determining the error on a full scale percent basis. Resultant specific problems are the determination of the compensation required, and the maintenance of the compensation at its bare minimum value. In practice, such maintenance is obtained by making all parts of materials having the same coefficients of expansion.

Under practical operating conditions, another serious difficulty may result from changes in the modulus of elasticity as the temperature of the apparatus varies. This problem is especially serious in the suppression system and particularly in the suppression spring or springs. For example, a 2% change in the suppression spring modulus may be expected to result in a 32% full span shift of the zero point. This difficulty may be eliminated, or suitably minimized, by the use of material such as the alloy known as "Ni-Span-C," having a modulus of elasticity which is not varied to any appreciable extent by temperature changes.

The various features of novelty which characterize our invention are pointed out with particularity in the claims annexed to and forming a part of this specification. For a better understanding of the invention, however, its advantages, and specific objects attained with its use, reference should be had to the accompanying drawings and descriptive matter in which we have illustrated and described preferred embodiments of the invention.

Of the drawings:

Fig. 3 is an elevation of the right end of apparatus shown in Figs. 1 and 2;

Fig. 4 is an elevation of the left end of apparatus shown in Figs. 1 and 2;

Figure 1:
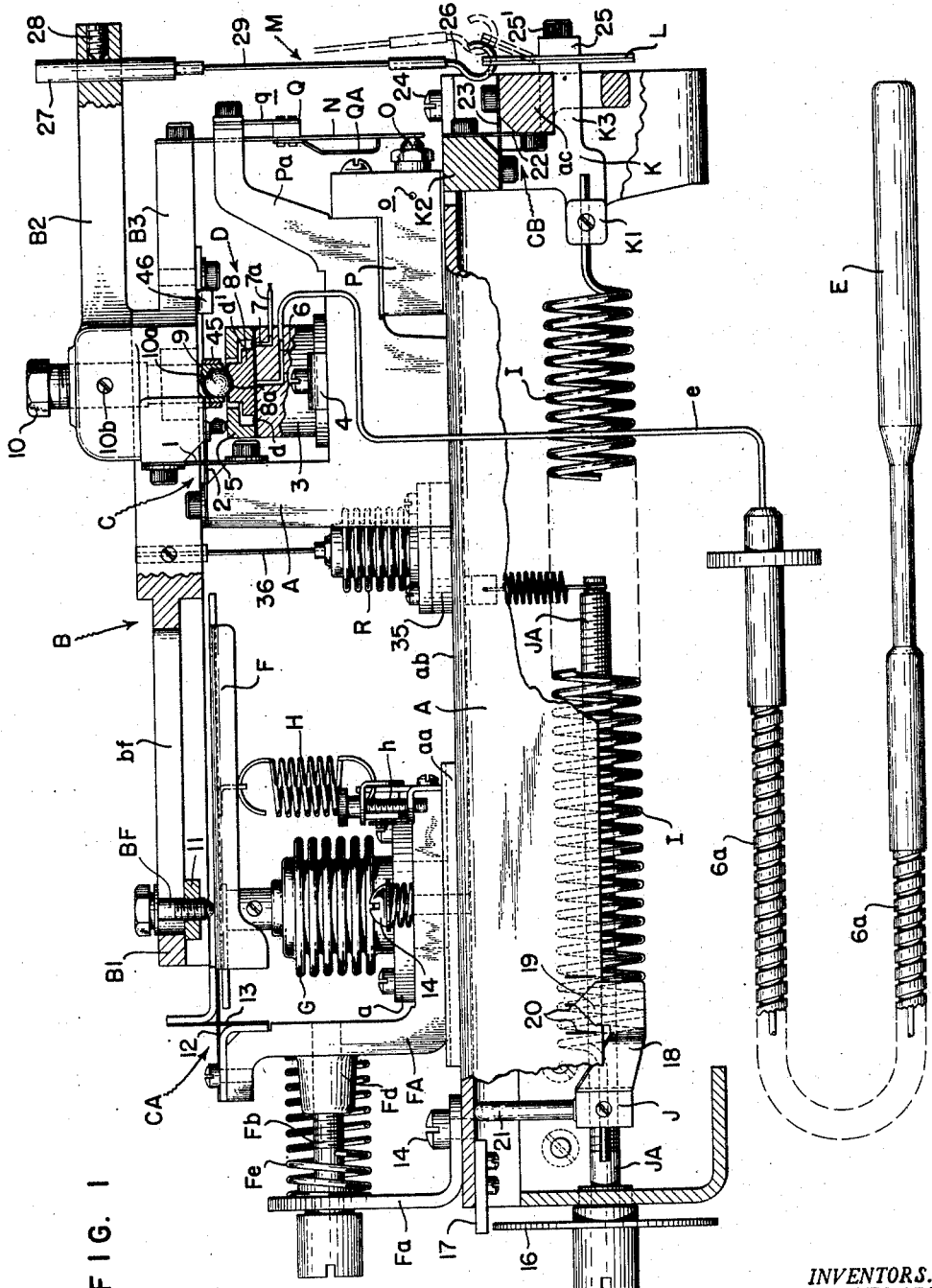
Fig. 1 is an elevation of our transmitter with apparatus broken away and in section.
Figure 2:
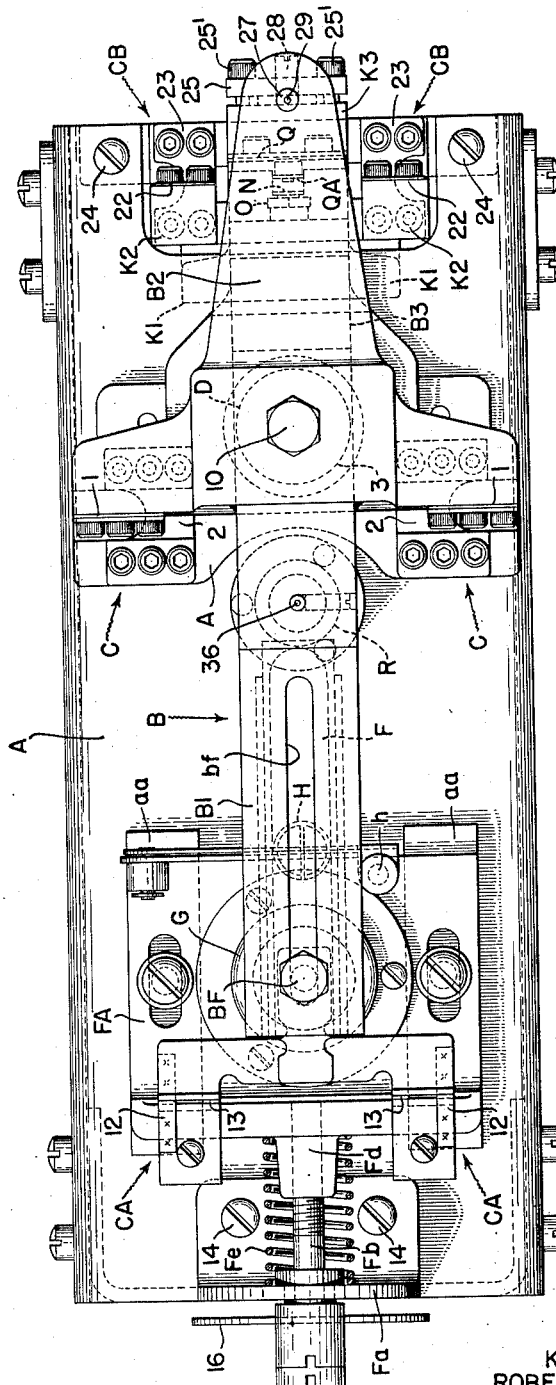
Fig. 2 is a plan view of apparatus shown in Fig. 1.

The apparatus illustrated by way of example in the drawings, comprises a supporting frame work or instrument chassis A and a main beam B, which is pivotally connected intermediately of its ends to said frame work. As shown, the beam B is formed with three substantially rigid horizontal arms, B1, B2 and B3, and is pivotally connected to a portion of the frame work A by a pair of cross spring type pivots C. Each of the cross spring pivots C comprises a vertical strip 1 and a horizontal strip 2. The upper end of strip 1 is connected to the beam B and the lower end of the strip 1 is connected to the frame work A. One end of the strip 2 is connected to the beam B and the other end is connected to the frame work A.

The strips 1 and 2 are ordinarily so disposed that the midpoint of one edge of the strip 1 engages or is in close proximity to the mid-point of the adjacent edge of the strip 2. The arm B1 extends to the left, and the arms B2 and B3 extend to the right of the pivot C. The arm B3 is located at a lower level than the arm B2.

The arm B2 is subjected to an upwardly acting force by means responsive to the measured or controlling variable. In the embodiment of the invention illustrated, the controlling variable is a fluid pressure applied to the diaphragm $d$ of a pressure responsive unit or capsule D. The pressure so applied is developed in a gas filled thermometer bulb E which is exposed to a variable furnace temperature or other source of variable temperature. The diaphragm $d$ is mounted on the upper side of a channeled block or base member 3 and is secured in place by a clamping ring 5. The latter has an inturned flange at its upper end. The block 3 is formed with a channel 6 opening at its upper end beneath the diaphragm $d$ and having its other end connected to the chamber of the bulb E by a capillary tube $e$. A portion of the tube $e$ connecting the bulb E to the block 3 is surrounded by armor in the form of a flexible metal tube $6a$. The thin chamber space between the top of the block 3 and the diaphragm $d$ to which the thermometer bulb pressure is transmitted by the capillary $e$ and channel 6, is in communication with one end of a second channel 7 in the block 3. The second end of the channel 7 is connected to one end of a filling tube $7a$. The latter has its outer end closed as by crimping action. As hereinafter explained, the high accuracy attainable with the apparatus disclosed herein depends upon and requires a particular ratio, which we conveniently designated as the "X-ratio," between the volume of the gas space within the bulb E and the volume of the gas space external to but in communication with the bulb space.

The pressure applied to the underside of the diaphragm $d$ is transmitted to the beam arm B2 through a button 8 formed with an annular rim portion which underlies the previously mentioned flange of ring 5 and thus limits the normal vertical movement of the button 8 to a small amount. The button 8 is formed at its upper side with a cavity $8a$ in which a ball 9 is seated. The latter is advantageously made of stainless steel. The upper side of the ball 9 is received in a cavity or recess $10a$ formed in the lower end of a vertical adjusting screw 10 extending through and in threaded engagement with the beam arm B2, in which the screw 10 is normally secured rigidly by a set screw $10b$. The screw 10 extends loosely through the arm B3. In practice, the adjustment of the screw 10 must be accurate within a tolerance limit of one one-thousandth part of an inch.

The beam arm B1 extends to the left as seen in Fig. 1 and carries an adjustable pin BF which acts on a rebalancing beam F below the beam B and parallel to the latter. The pin BF extends through a longitudinal slot $bf$ in the beam B1, and may be clamped by a nut 11 in any position along the slot into which it may be adjusted. The beam F is pivotally connected to a frame portion or section FA by a cross spring type pivot CA similar in form to the pivot C and comprising spring strips 12 and 13, and having its pivot axis transverse to the length of the beams B and F. The frame portion FA is supported by a bearing plate $aa$ mounted on a flat horizontal wall portion $ab$ of the frame work A. The frame portion FA comprises an elongated horizontal base portion engaging the bearing plate $aa$, and an upwardly extending portion at its left end as seen in Fig. 1. The strip 12 is horizontal and has one end connected to the upper end of the uprising portion of the frame section FA, and has its other end connected to a horizontal portion of the beam F. The strip 13 is vertical and has one end connected to the uprising portion $fa$ of the frame section FA and has its other end connected to an uprising extension of the beam F.

The frame section FA is arranged for longitudinal adjustment on the plate $aa$, by means comprising a bracket $Fa$ having a horizontal portion detachably secured by two bolts 14 to the top wall portion of the main frame A. The bracket $Fa$ also includes an uprising portion alongside the uprising portion of the frame section FA. The uprising portion of the bracket $Fa$ is connected to the uprising portion of the frame section FA by a screw $Fb$. The latter has its head swivel connected to the uprising portion of the bracket $Fa$ and has its elongated horizontal body $Fb$ externally threaded and extending through an internally threaded passage in a hub portion $Fd$ of the frame section FA. A helical spring $Fe$ interposed between the frame section FA and bracket $Fa$ insures against lost motion in the connection between the members FA and $Fa$. The beam F is subjected to an upwardly acting force by a rebalancing or follow-up bellows element G mounted on the removable frame work section $a$. As is hereinafter explained, fluid under pressure in the bellows G subjects the rebalancing beam F to a force tending to turn the beam F counter-clockwise as seen in Fig. 1. Such counter-clockwise movement of the beam F is opposed by a tension spring H having its upper end connected to the beam F and having its lower end adjustably connected to the frame section FA through a screw $h$. The secondary beam F, frame section FA, bracket $Fa$, screw $Fb$, bellows G, spring H and screw $h$ form a convenient and effective unit cooperating with the pin BF to adjust or regulate the application of the rebalancing or follow-up force to the main beam B. Said unit may be bodily detached from the frame work A for inspection and repair by removal of the four screws 14. The purpose and operating effect of the bellows G is hereinafter more fully explained.

The suppression system, which is an important feature of the improved instrument, comprises two parallel, elongated, horizontal, suppression springs I shown as generally parallel to the beams B and F. The left ends of the springs I, as shown in Fig. 1, are each anchored in a transverse abutment bar or cross-head J which is normally stationary, but may be adjusted in the direction of the lengths of the springs I by a rotatable zero adjusting device in the form of a long screw JA. The screw JA is journalled in a transverse vertical portion of the frame work A, and carries and rotates a dial 16 cooperating with a stationary index element 17 to indicate the angular adjustment position of the screw JA. As shown, the abutment member J is provided with an arm 18, including an index 19 moving along a scale 20 carried by the portion $ab$ of the frame A. Said portion is in the form of an inverted trough with a flat upper wall which is engaged by the upper ends of uprising post or guide elements 21 respectively associated with the two springs I. Each element 21 has its lower end anchored in the cross-head J above the axis of the corresponding spring I. The flat upper wall of the body portion of the frame A cooperates with the parts 21 to prevent each spring I from rotating about the axis of the element JA.

The right hand ends of the springs I, as seen in Fig. 1, are each connected to a lower portion K1 of a lever member or moment arm K pivoted to turn about the axis of a pivot CB. The latter is of the cross spring type comprising two vertical spring strips 22 each having its upper end connected to an upper portion K2 of the abutment member K and each having its lower portion connected to the vertical side of a detachable, but normally stationary, portion $ac$ of the frame work A. Each of the horizontal spring strips 23 of the pivot CB has one end connected to the portion K2 of the member K and has its second end portion connected to the upper side of the frame part $ac$. As shown, the frame part $ac$ is detachably connected to the main frame work by screws 24. The member K has a generally horizontal lower arm or projection K3 at the right of and below the axis of the pivot CB to which an uprising bi-metallic bar or strip L is secured.

The bi-metallic metal strip or bar L is secured to the portion K3 of the member K by a clamping bar 25 and screws 25'. The upper portion of the bi-metallic element L is connected to the free end of the arm B2 by a link M. The lower end of the latter is in the form of a hook 26 extending through an aperture in the upper end portion of the element L. The upper portion of the element M is in the form of a bar or rod section 27 extending through a vertical aperture in the beam arm B2 and adjustably clamped to the latter by a set screw 28. The intermediate portion of the link M is formed by a flexible element 29, which may be a cable section. In operation, the beam B is subjected to a clockwise torque about its pivot C by the tension of the springs I. The bi-metallic element L increases or decreases this torque by varying the moment arm of member K as the bi-metallic element L deflects toward or away from the position shown in dotted lines in response to changes in the ambient temperature.

The free or right hand end of the arm B3, as seen in Fig. 1, supports a depending flapper valve N. The flapper valve N is movable toward and away from the discharge end of a horizontal nozzle O, which is mounted in a supporting nozzle block P attached to the righthand side of the frame structure A. The nozzle member O is externally threaded and is received in a horizontal threaded socket formed in the block P. The axial adjustment position of the nozzle O is important, and the latter may be secured in any desired adjustment position by a set screw o threaded into the block P. The block A supports an uprising arm portion PA having a horizontal upper end portion which supports a guide Q loosely surrounding an intermediate portion of the flapper valve N. As shown, the guide member Q is suspended from the upper end of the arm PA by a flexible strip q. A depending arm QA having its upper end connected to the guide Q has its lower end normally in engagement with the side of the flapper valve N adjacent the block P, at a level slightly above the nozzle O. With the described arrangement, the free end of the arm B3 is normally in or above its horizontal position shown in Fig. 1. With the arm B3 in its horizontal position, the lower end of the flapper N is at a minimum distance from the nozzle O. The extent of that minimum distance may be adjusted by rotating the nozzle O in its threaded socket. When the beam arm B3 is moved upward from or downward toward its horizontal position, the guide Q causes the lower end of the flapper valve to move respectively away from or toward the nozzle O.

The means shown in the drawings for compensating the instrument against the effects of change in barometric pressure comprises a bellows element R. The latter has its lower end wall rigidly connected through its base member 35 to the main frame member A, and has its upper end wall rigidly connected by a rod 36 to the main beam B adjacent, but slightly to the left of, the pivot C, as seen in Fig. 1. The bellows R is substantially completely exhausted so that the pressure of the atmosphere against the full horizontal area of the bellows acts to create a downwardly acting force transmitted through the rod 36 to the beam B tending to turn the latter about the pivot C in the counter-clockwise direction as seen in Fig. 1. Thus an increase or decrease in the ambient atmospheric pressure tends to move the free end of the arm B3 and the flapper valve N up or down from its previously balance position.

In normal operation, the instrument shown in the drawings operates on the force balance principle to maintain the beam B in a position which varies from one end to the other of the span for which the instrument is adjusted, as the resultant of the forces acting on said beam varies between the minimum and maximum values for said span. Each of the various forces acting on the beam tend to turn the latter about the axis of its pivot C only in the clockwise, or only in the counter-clockwise direction, as seen in Fig. 1, except for bellows R which acts either way. Some of those forces act upwardly, while others act downwardly on the beam, and some of the forces act on the portion of the beam B at one side of the pivot C, while others act on the portion of the beam at the other side of said pivot. As shown, one of the forces which tend to turn the beam clockwise, as seen in Fig. 1, comprises the force transmitted to the beam B by the pivoted suppression system including the element K, which is connected to the beam arm B2 by the bi-metallic member L and link M. Another of these forces comprises the force transmitted to the beam by the bellows G acting on the beam arm B1 through the secondary lever F and pin BF. The forces tending to turn the beam B counter-clockwise, as seen in Fig. 1, comprise the diaphragm d which acts on the arm B2 through ball 9 and screw 10, and the tension spring H which acts on the beam F through the secondary lever F and the pin BF. The barometric compensating bellows R acting on the beam B through the stem 36, will tend to rotate the beam in either direction depending upon whether barometric pressure is increasing or decreasing.

In practice, the maximum normal displacement of the beam B from an intermediate position in its range of movement, may be that required to effect a maximum movement of the flapper valve N toward and away from the nozzle O. That movement is minute and ordinarily may be about one one-thousandth of an inch. The ultimate purpose of the apparatus is to maintain a pneumatic transmission pressure which varies in predetermined proportion with the fluid pressure maintained in the bleed nozzle O, and may well be four times the nozzle pressure. In ordinary practice, the transmission or controlled pressure system, shown diagrammatically in Fig. 5, comprises a detection unit including the flapper N, nozzle O, and nozzle block P, a manifold S, a pilot valve T, and the follow-up or rebalancing bellows G and associated conduits, and may well include a rate responsive unit U.

Figure 5:
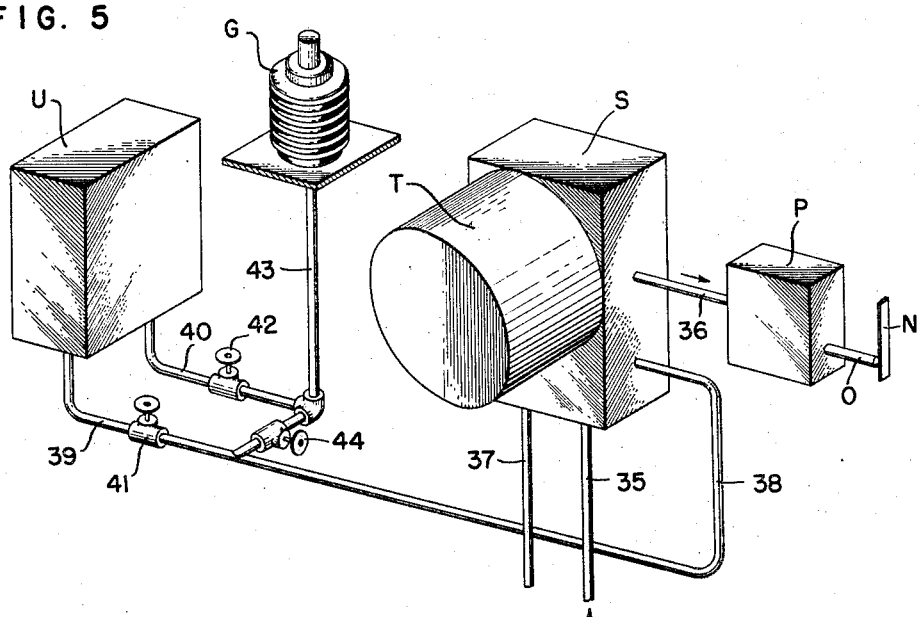
Fig. 5 is a diagram illustrating the piping and structural apparatus included in the pressure transmission system of the apparatus.

The manifold S shown in Fig. 5 is a chambered body containing a plurality of channels or conduits in communication with different portions of the chambered pilot valve T, and through which the latter is connected to different elements of the system shown diagrammatically in Fig. 5. The pilot valve T may be of a well known non-bleed type such, for example, as that shown in U. S. Patent 2,445,255 of G. S. Younkin. Through channels in the manifold S, the pilot valve T receives air under a suitable constant pressure, which may well be of the order of 20 pounds per square inch, through a pipe 35 from an unshown compressed air supply source.

The pilot valve T comprises a pressure chamber in which air received from the supply pipe 35 is utilized in maintaining a control and transmission pressure which depends directly on the pressure in the bleed nozzle O and is in predetermined proportion to that pressure, and is ultimately dependent on, and proportional to the pressure in the thermometer bulb E. The pressure in the pilot valve pressure chamber is transmitted through a pipe 37 to a recorder, and usually also to a regulating valve or the like, and is transmitted through a pipe 38 to the follow-up or rebalancing bellows G directly, or indirectly, through a rate action unit U. The latter has terminals 39 and 40. The terminal 39 is connected by a valve 41 to the pipe 38. The terminal 40 is connected by a valve 42 to a pipe 43 which is in communication with the chamber in the bellows element G. A valve 44 connects the pipe 38 directly to the pipe 43. With the valve 44 open and the valves 41 and 42 closed, the pressure in the pipe 38 is transmitted directly to the bellows element G. With the valve 44 closed and the valves 41 and 42 open, changes in pressure in the pipe 38 are transmitted to the bellows G through the rate unit U which acts in a well known manner to retard changes in the pressure in the bellows G produced by pressure changes in the pressure chamber of the pilot valve T. Since the pilot valve T and the rate unit U may each be of well known type and their specific constructions form no part of the invention claimed herein, further description of the elements T and U is unnecessary.

The pneumatic transmitting apparatus illustrated and described herein is desirably characterized by its rugged construction. The thermal responsive capsule D, which is the only element of the apparatus apt to be injured in shipping if unprotected, is adequately protected by the cylinder 45 shown in Fig. 1. The diaphragm d of the element D has only a minute movement in normal operation. To avoid risk of injury to the diaphragm d in shipment, the cylinder 45 is interposed between the diaphragm d and the primary or main beam B. As shown, the lower end portion of the cylinder surrounds the central portion of the button 8 and loosely engages the outwardly extending flange portion of said button and is loosely surrounded by the flange 5. In regular operation, the cylinder 45 is free to share the normal up and down movement of the diaphragm and its weight is too small to have any significant effect on that movement. To prepare the apparatus for shipment, a forked element 46 mounted on the main beam is adjusted into the position in which its bifurcations engage the upperside of a peripheral flange portion of the cylinder 45 and holds the diaphragm d in its normal position.

Our improved pneumatic transmitting apparatus is characterized in particular by its separate and effective zero and span adjustment provisions. In practice, the zero adjustment must be a calibrated adjustment, and the zero operating point of the instrument should be suitably indicated on the instrument. It is practically important also that scale points corresponding to the zero plus 50 degrees F., and to the zero minus 50 degrees F., should be indicated on the instrument. Each zero adjustment is effected by moving the cross-head or abutment member J of the suppression spring system to the right or left, respectively, as seen in Fig. 1, to thereby decrease or increase the tension of the suppression springs I. As has been explained, the cross-head J is given its adjusting movements by the rotation of the long screw JA which is journalled in the frame work A and is in threaded engagement with the abutment J. The rotation of the screw JA in one direction or the other elongates or shortens the springs I, and thus, respectively, raises or lowers the zero point of the instrument.

A coarse adjustment of the cross-head J and resultant zero point adjustment is indicated by the position of a pointer 19 along the scale marks 20 carried by the instrument frame work A, as shown in Fig. 1, the pointer 19 being carried by the free end of the arm 18 attached to the cross-head J. A fine zero point adjustment is indicated by the angular position of a rotatable dial 16 relative to a stationary index 17. The latter is carried by the frame work A. The zero point position of the cross-head J corresponds to the low temperature end of the span.

The span range depends on the interaction of main beam B and the secondary beam F. The span adjustment provisions in our pneumatic transmitter are like the zero point adjustment provisions in that they comprise means for effecting a coarse span adjustment and means for effecting a fine span adjustment. The coarse span adjustment is effected by adjusting the position along the length of the slot bf in the beam B in which the pin BF is clamped to said beam. The fine span adjustment is effected by rotation of the screw Fb to thereby move the beam section FA in the longitudinal direction of the beam F toward or away from the pivot C. Each of the described coarse and fine span adjustments modifies the leverage with which the follow-up or rebalancing pressure in the bellows G is applied to the beam B. That leverage is increased and decreased by adjustment of the pin BF in the slot bf respectively away from and toward the pivot C. That leverage is also increased and decreased by respective adjustments of the member FA toward and away from the pivot C. An increase in said leverage decreases the length of the measurement span and a decrease in the leverage elongates that span.

The manner in which the pressure transmitted from the pilot valve through the pipe 37 is dependent on various operating factors and conditions, is made apparent by the following equation:

$$P = \frac{P_0}{T_0}\left[\frac{X+1}{\frac{1}{t}+\frac{X}{TB}}\right] \quad \text{(Equation 1)}$$

In the foregoing Equation 1, P designates the transmitted pressure; $P_0$ designates the pressure and $T_0$ designates the temperature at which the thermal unit or system shown in Fig. 1 is charged with gas through the pipe 7a; X designates the previously mentioned "X-ratio"; t designates the ambient temperature; and TB designates the bulb temperature. As the foregoing equation indicates, any variation in the X-ratio, the bulb temperature TB, or in the ambient temperature t will affect the output pressure P.

Figure 6:
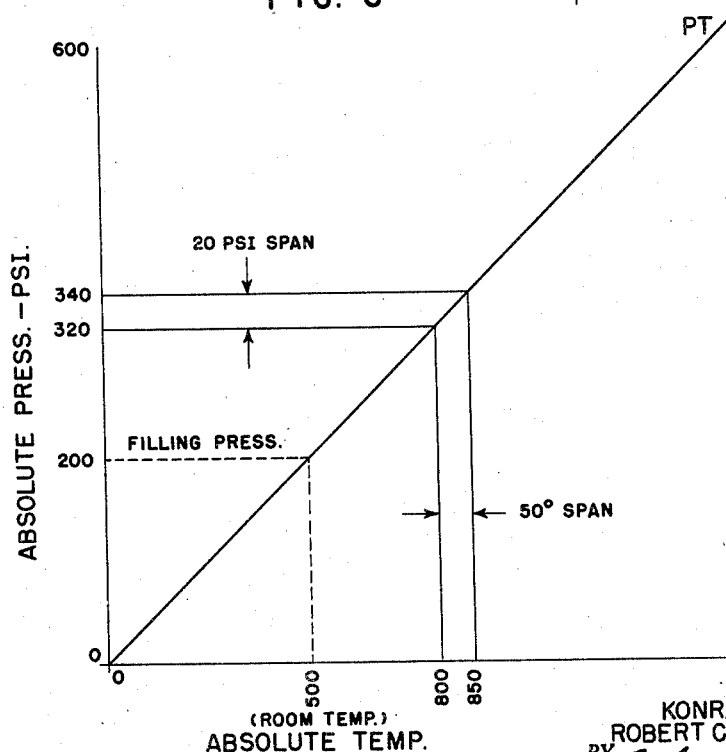
Fig. 6 is a diagram illustrating absolute instrument pressure on temperature changes produced by changes in the controlling variable.

In practice, we have found that when the X-ratio, i. e., the volume of the bulb gas space divided by the volume of the thermal system gas space external to the bulb, is approximately 80, the pressure of the gas in the thermal system will vary approximately in linear proportion to changes in the bulb temperature. The temperatures and pressures referred to in the foregoing equation and in the determination of the X-ratio, are absolute temperatures and pressures. By way of illustration and example, the pressures and temperatures involved in operation of the transmitter shown in the 50° span between temperatures of 800° absolute and 850° absolute are shown in Fig. 6. As is indicated in Fig. 6, which is a diagram, the thermal system is charged with gas at the room temperature of 500° absolute, and with a filling pressure of 200 p. s. i. For 50° span operation, the absolute gas pressure varies from a minimum of 320 p. s. i. to a maximum of 340 p. s. i. and the absolute gas temperature varies from a minimum of 800° to a maximum of 850°. The diagonal line 0—PT which indicates both the gas pressure changes and the gas temperature changes, is approximately a straight line. Any significant variation in said X-ratio would result in a departure of the line 0—PT from a straight line. Each span is only a relatively small portion of the total range of operation and the practical effect of a small non-linearity in the line 0—PT is unimportant.

In operation, unbalancing pressures acting on the beam B are quickly balanced out by the rebalancing mechanism including the bellows G. The suppression ratio is the ratio of the pressure at the bottom of the scale divided by the pressure span. Since the line 0—PT of Fig. 6 is essentially a straight line, the suppression ratio is also equal to the absolute temperature at the bottom of the scale divided by the temperature span. The suppression ratio is also equal to the forces on this diaphragm at the bottom of the scale divided by the change in force required to get full scale output. The suppression ratio of this instrument will be as high as 15 or 20 to one, and any error in the suppression system must be multiplied by the suppression ratio in evaluating the effective error as a percent of full scale.

Although the ambient temperature appears at only one point in the foregoing Equation 1, the effects of a change in ambient temperature depend upon other factors. Thus the ambient temperature correction or compensation required will change as a result of changes in the "X-ratio," and in the bulb temperature as well as when the ambient temperature changes. Also each change in the zero point of the pressure transmitter theoretically requires a variation in the amount of compensation given the instrument on a given change in ambient temperature. Thus it is not theoretically possible to obtain perfect compensation under all conditions at all points in the transmitter system. However, the magnitudes of the compensation difficulties are greatly minimized in our instrument by the provisions made for adjusting the compensation for ambient temperature; by a suitable selection of materials; and by suitably relating the different elements.

Three relatively large sources of gradients are the thermal diaphragm, the flapper assembly, and the suppression system. It is practically possible to keep the thermal diaphragm gradient relatively small by using the thinnest possible material that will withstand an operating pressure as high as 600 p. s. i. To this end, the diaphragm $d$ is advantageously a phosphor-bronze disc about .0018" thick. Even with such thin material, the gradient is still approximately one thousand pounds per inch.

The thin phosphor-bronze diaphragm $d$ advantageously has a diameter of about 0.7", and has one small convolution about 0.008 inch deep between the button or rigid follower 8 and the lower portion of the clamping cylinder 5. We have found that the surface of the base of the capsule D directly under the flat central portion of the diaphragm requires a phonograph finsh, 0.002" deep with 0.012" lead in order to insure the pressure needed to lift the diaphragm when it is subjected to a high suppression force. To permit the capsule D to be desirably small and to totally preclude gas leakage, the three elements, 3, 5, and 8, of the capsule are advantageously held in a jig while the whole assembly is silver soldered together in an induction heater. After the bulb E and capillary $e$ are attached, the capsule system is filled with a suitable gas, preferably helium, to establish a gas pressure in the bulb of 800 p. s. i. Thereafter, the pressure in the bulb is reduced to 200 p. s. i. The bulb pressure is varied back and forth between 200 and 800 p. s. i. several times. This effectually purges air from the thermal system and automatically forms the single convolution $d'$ in the diaphragm $d$. In lieu of the use of helium, some other inert gas, such as argon or krypton may be used. Nitrogen, which is ordinarily used in gas thermometers, diffuses through stainless steel at temperatures above 800° F. Helium is preferred to other inert gases because it is well adapted for use down to a temperature of minus 375° F. It is to be noted that thermometer bulbs filled with inert gas may be operated at temperatures up to 1,200° F.

To suitably reduce the flapper assembly gradient, use should be made of the thinnest possible spring material and the parts should be suitably proportioned.

The suppression system gradient can be kept relatively small by making each of the tension springs I a helix with a great many turns. The use of a large number of turns is made practically feasible in our instrument by mounting the elongated springs I alongside the main beam B so that the length of each spring may be comparable with the length of the beam B.

As will be apparent, the matter of compensation for ambient temperature and barometric pressure changes, is of prime importance in the operation of our improved apparatus. We have sought to obtain optimum compensation results, partly by minimizing the need for such compensation, and partly by improvements in the means utilized for effecting compensation. As previously explained, we substantially eliminate the need for compensation as a result of variations in the modulus of elasticity of the suppression spring system by making the springs of a metal having a modulus of elasticity practically independent of the temperature of said material.

We have simplified and improved the means for effecting compensation by connecting the flapper to one end of the main rebalancing beam B and by using a bi-metallic compensator L as a connector between the beam and the lever member K through which the springs I are connected to the beam. We have also improved the compensating apparatus by utilizing a barometric compensator which is substantially completely exhausted instead of a compensating bellows element of the type disclosed in the previously mentioned Allwein patent, wherein a small amount of air is held in a bellows element so that the latter may provide compensation both for changes in the pressure of the atmosphere and for changes in ambient temperature. By suitably regulating the leverage in the mechanical connection between the main beam and the tension springs I, it is possible to use springs I of such small weight that the relatively high cost of the Ni-Span-C material will be desirably small.

The ideal calibration for each span would involve nothing more than the determination of the zero point followed by a determination of the span setting or measured temperature indicated by the full scale condition of the apparatus. The described procedure will permit a close approximation to the ideal calibration desired.

From an analysis of our transmitter, the following equation may be derived:

$$\frac{P}{T_B} = \frac{1}{B}\left[\frac{1}{\frac{1}{\mu B}+1}\right] \qquad \text{(Equation 2)}$$

Where:

$$B = \frac{A_2 R_2}{C A_1}$$

$$\mu B = \frac{R_1 R_2 \lambda n G A_2}{K}$$

$K$ = total system gradient
$G$ = pilot valve gain
$\lambda n$ = nozzle pressure change per inch of flapper motion
$C$ = relation between bulb temperature and gas pressure in thermal system
$A_1$ = thermal diaphragm area
$A_2$ = area of rebalancing bellows
$R_1$ = ratio of thermal diaphragm motion to flapper motion
$R_2$ = ratio of thermal diaphragm motion to rebalancing bellows motion One conclusion indicated by the foregoing Equation 2, is that to effectually eliminate non-linear pilot valve characteristics, $\lambda n$ and $G$, the system gain $G$ must be kept large, and the total gradient $K$ of the system must be held to a minimum.

The apparatus hereinbefore described in detail, provides a direct measure of the temperature indicated by the thermometer bulb pressure. The apparatus previously illustrated and described can be modified to measure the pressure transmitted to the capsule D from a variable source of pressure.

Major differences between the temperature measuring and the pressure measuring forms of the invention are that:

(1) When the basic mechanism of the instrument is independent of ambient temperature change, no theoretical ambient temperature compensation is required when the instrument is of a form or model for use in measuring pressure instead of a form or model for use in measuring temperature. However, if the pressure measured is the pressure of a corrosive liquid and a liquid filled pressure seal is employed to segregate the corrosive fluid used, some compensation may be required to take care of fluid expansion effects.

(2) Calibration of the pressure model is much simpler for all ranges above 100 p. s. i., since a dead weight tester may be used.

(3) The barometric compensating bellows R of Fig. 1 is not needed in the pressure model to compensate for barometric pressure changes, but may be retained in the pressure measuring instrument for use in obtaining absolute pressure measurements.

(4) In the pressure model, the bulb and capillary tube of the temperature model shown in the drawings, may be replaced by a simple pressure connection, or by a liquid filled pressure seal when corrosive fluid pressures are to be measured.

(5) In the temperature model, the narrow span of 50° F. is equivalent to 18 p. s. i. and the maximum range limit of 1,000° F. is equivalent to approximately 600 p. s. i. Therefore, the allowable span adjustment of the pressure model would be from 20 p. s. i. to 150 p. s. i., and the range limits would be from 15 p. s. i. to 600 p. s. i.

While, in accordance with the provisions of the statutes, we have illustrated and described the best forms of embodiment of our invention now known to us, it will be apparent to those skilled in the art that changes may be made in the forms of the apparatus disclosed without departing from the spirit of our invention as set forth in the appended claims and that in some cases certain features of our invention may be used to advantage without a corresponding use of other features.

Having now described our invention, what we claim as new and desire to secure by Letters Patent, is:

1. A force balance type pneumatic transmitter comprising in combination, a beam, means pivotally supporting said beam for turning movement about a transverse axis, mechanism subjecting said beam to forces tending to turn the beam about said axis in one direction comprising an expansible element responsive to variations in a control condition, and a barometric compensating device, and mechanism subjecting said beam to forces tending to turn the beam about said axis in a direction opposite to the first mentioned direction comprising rebalancing means, spring suppression means, and a bi-metallic element acting on said beam in series with said spring suppression means, and operative to increase or decrease the effect of said spring suppression means on said beam as the ambient temperature varies in one direction or in the opposite direction.

2. In a pneumatic transmitter of the force balance type comprising a deflecting member and means for subjecting said member to a deflecting force responsive to variations in an independent variable, and separate means for subjecting said member to rebalancing and spring suppression forces; the improvement comprising regulable means for compensating for ambient temperature changes and regulable means for compensating for barometric pressure changes, said means being independent of and separate from each other.

3. In a pneumatic transmitter of the force balance type comprising a deflecting member and means for subjecting said member to a deflecting force responsive to variations in an independent variable, and separate means for subjecting said member to rebalancing and spring suppression forces; the improved barometric pressure compensating means comprising a substantially completely exhausted expansible chamber connected between said member and stationary means and normally held in an expanded position by said member, and bi-metallic means for subjecting said member to a force compensating for changes in ambient temperature.

4. In a pneumatic transmitter of the force balance type, comprising a first beam mounted to pivot about an axis, means responsive to an independent variable subjecting said beam to a torque force tending to turn the beam about said axis in one direction, and adjustable rebalancing mechanism comprising a second beam alongside the first beam and pivoted to turn about an axis parallel to the first mentioned axis but laterally displaced from the latter, means acting between said beams and adjustable transversely of said beams and through which said second beam is arranged to subject the first beam to a second torque force tending to turn the latter in a second direction opposite to the first mentioned direction, and a rebalancing element adjustable longitudinally of said first beam and subjecting said second beam to a variable rebalancing force tending to turn said first beam about its pivot in said second direction.

5. In a pneumatic transmitting apparatus of the force balance type comprising a frame work, a deflecting member and means for subjecting said member to a deflecting force responsive to the variations of an independent variable, and separatae means for subjecting said member to rebalancing, spring suppression and compensating forces; the improvement in which said deflecting member is an elongated beam pivotally connected to said frame work to turn about an axis transverse to its length, and in which the means for subjecting said member to said spring suppression force comprises two side-by-side elongated helical springs each comprising a multiplicity of convolutions of a diameter which is a minor fraction of the length of the spring, and a cross head connected to one end of each spring, and a threaded connection between said cross head and the instrument frame work adjustable to vary the effective lengths of said spring.

6. An improvement as specified in claim 5, in which guide members attached to said cross head cooperate with said frame work to prevent movement of said cross head transverse to the axes of said springs.

7. An improvement as specified in claim 5, in which coarse and fine adjustment indicating means for showing changes in the adjustment positions of said spring means are attached to said springs.

8. In a pneumatic transmitter of the force balance type comprising a deflecting member and means for subjecting said member to a deflecting force responsive to variations in an independent variable, and separate means for subjecting said member to rebalancing and spring suppression forces; the improvement comprising means for compensating for ambient temperature changes, which means comprise a bi-metallic element located between said means for subjecting said member to spring suppression forces and said member so as to vary the moment of the leverage which said means for subjecting said member to said spring suppression forces exerts on said member.

9. An improvement as specified in claim 8 including adjustment indicating means for showing the adjustment positions of said bi-metallic member.

10. In a pneumatic transmitter of the force balance type, a pivotally mounted beam, suppression springs tending to rotate said beam about its pivot, and a bi-metallic element connected to the free end of said springs and to said beam and adapted to deflect in response to changes in ambient temperature, said deflection varying the moment arm of the force which said springs exert on said beam.

11. In a pneumatic transmitter of the force balance type, the improvement comprising, a supporting frame work, a first beam mounted to rotate about a pivot fixed to said frame work, said beam having a slot extending longitudinally thereof, a pin mounted in said slot so as to be secured in adjusted position therealong, a frame section mounted on said frame work, means for moving said frame section toward or away from said pivot, means securing said frame section to said frame work in a selected position, a rebalancing beam mounted to rotate about a pivot fixed on said frame section and to engage said pin, means responsive to the variations in an independent variable and engaging said first beam so as to rotate said first beam in one direction, and second means responsive to the movements of said first beam and connected to said rebalancing beam so as to rotate said rebalancing beam and consequently to rotate said first beam in the opposite direction and thereby rebalance said first beam.

12. In a pneumatic transmitter of the force balance type, comprising a first beam mounted to pivot about an axis, means responsive to an independent variable subjecting said beam to a torque force tending to turn the beam about said axis in one direction, and adjustable rebalancing mechanism comprising a second beam alongside the first beam and pivoted to turn about an axis parallel to the first mentioned axis but laterally displaced from the latter, means acting between said beams and through which said second beam is arranged to subject the first beam to a second torque tending to turn the latter in a second direction opposite to the first mentioned direction, a rebalancing element subjecting said second beam to a variable rebalancing force tending to turn the first beam about its pivot in said second direction, said second beam and said rebalancing element being adjustable longitudinally of said first beam.

13. In a pneumatic transmitting apparatus of the force balance type comprising a deflecting member and means for subjecting said member to a deflecting force responsive to variations in an independently variable force; the improvement consisting of: a bellows subjecting said member to a rebalancing force and having a movable portion adapted to be actuated by a force which varies in accordance with the deflections of said deflecting member, and a spring connected to said movable portion of said bellows independently of said deflecting member so as to oppose the force applied by said bellows to said member so as to compensate for that pressure which stresses said bellows when the apparatus is in its starting position.

14. In a pneumatic transmitter of the force balance type, the improvement comprising, a supporting frame work, a beam mounted to rotate about a pivot fixed to said frame work, first means responsive to the variations in an independent variable and engaging said beam so as to rotate said beam in one direction, a suppression spring having one portion fixed to said frame work and another portion connected to said beam so as to rotate said beam in the opposite direction and thereby to set the position of said beam at the lower end of its span, second means having a movable portion responsive to the movements of said beam and operable so as to rotate said beam in said opposite direction and thereby rebalance said beam, and a second spring having one portion fixed to said frame work and another portion connected to said movable portion of said second means independently of said beam and operable to counterbalance said movable portion of said second means against the minimum force applied to said movable portion of said second means because of the spring characteristics of said second means and because of the minimum air pressure applied to said second means and not in response to movements of said beam.

References Cited in the file of this patent
UNITED STATES PATENTS

| | | |
|---|---|---|
| 2,295,728 | Gess | Sept. 15, 1942 |
| 2,478,947 | Shames et al. | Aug. 16, 1949 |
| 2,536,198 | Matner et al. | Jan. 2, 1951 |
| 2,598,681 | Garbarini et al. | June 3, 1952 |
| 2,601,777 | Woodward | July 1, 1952 |
| 2,608,200 | Stockman | Aug. 26, 1952 |
| 2,626,626 | Rosenberger et al. | Jan. 27, 1953 |

FOREIGN PATENTS

| | | |
|---|---|---|
| 200,308 | Great Britain | July 12, 1923 |
| 536,537 | Great Britain | May 19, 1941 |
| 562,645 | Great Britain | July 11, 1944 |
| 643,340 | Great Britain | Sept. 20, 1950 |

OTHER REFERENCES

Moore Instruments, vol. 18, September 1945, page 601.

"Operating Instructions and Parts List for Taylor Pneumatic Transmitter." 1944.